United States Patent [19]

Simonov et al.

[11] 3,864,414
[45] Feb. 4, 1975

[54] METHOD FOR PURIFICATION OF TECHNICAL HEXACHLORBUTADIENE FROM CHLORORGANIC ADMIXTURES

[76] Inventors: Vadim Dmitrievich Simonov, Kolsevaya ulitsa, 49, kv. 20; Anatoly Vasilievich Ivanov, ulitsa Kosmonavtov, 18, kv. 22, both of UFA; Lev Markovich Kogan, Kutuzovsky prospekt, 9, kv. 90, Moscow; Markus Vladimirovich Ljubarsky, prospekt Oktyabrya, 105/3, kv. 49, UFA; Gennady Timofeevich Dremin, Pekinskaya ulitsa, 20, kv. 14, UFA; Boris Ivanovich Voronenko, Rossiiskaya ulitsa, 5, kv. 33, UFA; Svetlana Fedorovna Burova, ulitsa Ostuzheva, 13, kv. 29, Voronezh, all of U.S.S.R.

[22] Filed: Feb. 3, 1972

[21] Appl. No.: 223,290

[52] U.S. Cl. ................................................ 260/655
[51] Int. Cl. ............................................. C07c 21/20
[58] Field of Search ......................... 260/655, 654 S

[56] References Cited
UNITED STATES PATENTS
2,418,109   4/1947   Scouce .............................. 260/655

OTHER PUBLICATIONS

Rutner et al., JACS 82; pp. 298,299, (1960) QD1A5.

*Primary Examiner*—Bernard Relfin
*Assistant Examiner*—Joesph A. Boska
*Attorney, Agent, or Firm*—Waters, Roditi, Schwartz & Nissen

[57] ABSTRACT

A method for purification of technical hexachlorobutadiene from chlororganic admixtures, consisting in that technical hexachlorobutadiene is treated with chlorosulfonic acid taken in the molar ratio of 1:1.4 and at a temperature of 100°–150°C. The thus prepared mixture is cooled to a temperature not above 80°C with formation of a layer of purified hexachlorobutadiene and a layer containing spent chlorosulfonic acid and oxidized chloroorganic admixtures. The said layer of the purified hexachlorobutadiene is separated, neutralized, washed with water and dried.

The described method provides hexachlorobutadiene of high purity, containing 99.5 – 99.98 percent by weight of the basic substance.

6 Claims, No Drawings

METHOD FOR PURIFICATION OF TECHNICAL HEXACHLORBUTADIENE FROM CHLORORGANIC ADMIXTURES

The invention relates to the production of hexachlorobutadiene of high purity. Pure hexachlorobutadiene is used to control phylloxera of vine, in the electrotechnical industry as the basic component of liquid insulation having a freezing point below −75°C, and also in the manufacture of fire-resistant hydraulic fluids and lubricating oils.

Technical hexachlorobutadiene, prepared for example, by chlorination of hydrocarbons having four carbon atoms, contains poly- and perchlorides which are by-products of the chlorination process. These admixtures are perchloroethylene, hexachloroethane, hexachlorocyclopentadiene, polychlorobutanes, etc.

A method is known for purification of technical hexachlorobutadiene from chloroorganic admixtures consisting in transferring a part of the above admixtures into water-and-alkali-soluble sulfides. According to this method, technical hexachlorobutadiene is treated with sodium hydrosulfite at a temperature of 125°C, then mixed with a 10 percent solution of sodium hydroxide at a temperature of 95°C, the organic layer is separated, dried with NaOH and fractionated in a column. The fraction boiling within the temperature range from 211 to 214°C is collected as the main product, washed with a solution of sodium hydroxide and dried. The yield and the quality of the purified hexachlorobutadiene are not specified (See U.S. patent No. 2,418,109.

The disadvantage of this method is the impossibility of separating of sparingly hydrolyzed admixtures, like hexachloroethane and perchloroethane, and the unavoidable fractionation step, which makes the process complicated.

According to another known process for purification of technical hexachlorobutadiene from chloroorganic admixtures, the product is washed with methyl alcohol, treated with sulfuric acid for two hours, washed with water, dried with $P_2O_5$ and fractionated at a pressure of 100 mm Hg. A 10 percent fraction of the initial charge, after distillation of 80 percent of the product, has a purity of 99.9 percent, a boiling point of 144.1°C/100 mm Hg, $n_D^{20} = 1.5557$, $d_4^{20} = 1.6794$ (See article by E. Ruthner, and S. H. Bour in "Journal of the American Chemical Society," vol. 82, No. 2, 1960, p. 298-304).

The main disadvantages of this method are that the yield of the main fraction is very low, that the fractionation is carried out in a vacuum and that it is difficult to carry out the process as a continuous process.

The object of this invention is to work out a method for purification of technical hexachlorobutadiene from chloroorganic admixtures that would allow the preparation of hexachlorobutadiene of high purity containing 99.5 – 99.98 percent by weight of the main product.

In accordance with this and other objects, the invention consists in reacting technical hexachlorobutadiene containing chloroorganic admixtures with chlorosulfonic acid taken in the molar ratio of 1:1-4 at a temperature of 100°-150°C. The obtained mixture is cooled to a temperature not above 80°C and separated into a layer containing the spent chlorosulfonic acid and dissolved oxidation products of chloroorganic compounds, and a layer containing the purified hexachlorobutadiene, which is then separated, neutralized, washed with water to neutral reaction, and dried by any suitable method, for example over calcium chloride.

During treatment of technical hexachlorobutadiene with chlorosulfonic acid, the chloroorganic admixtures like perchloroethylene, hexachloroethane, hexachlorocyclopentadiene and polychlorobutanes are oxidized into various compounds, viz., carboxylic acids, anhydrides and chloroanhydrides of acids and partly to carbon dioxide. Owing to its marked chemical inertness, hexachlorobutadiene is not oxidized under these conditions.

In order to reduce the time during which technical hexachlorobutadiene is treated with chlorosulfonic acid, the process should be carried out in a current of chlorine taken in the molar ratio to hexachlorobutadiene of 0.01 - 0.3:1. The effect of chlorine is especially pronounced in purification of technical hexachlorobutadiene containing admixtures in amounts of more than 5 percent by weight.

Hexachlorobutadiene purified by the described method, although containing as much as 99.95 percent of the main substance, still cannot be used in the manufacture of liquid insulation, since traces of polar admixtures impair its electrotechnical properties. Final purification of hexachlorobutadiene from these trace quantities, is obtained by distillation, during which the main part of the admixtures remains in the vat and only an insignificant part is distilled together with the first fractions.

Electrotechnical hexachlorobutadiene can also be obtained by another method, in which the distillation step is omitted. In this process, technical hexachlorobutadiene is reacted with chlorosulfonic acid, cooled, and the layer of thus purified hexachlorobutadiene is separated as was described above. The subsequent neutralization of the purified hexachlorobutadiene is carried out at a temperature of 80°-100°C, and the product is then washed with chemically pure water. Hexachlorobutadiene is then dried, as has already been described, and treated with a polar adsorbent, silica gel or alumina, taken in an amount of not less than 3 percent by weight with respect to the purified hexachlorobutadiene.

The use of the said polar adsorbing materials improves the electrotechnical specifications of the purified hexachlorobutadiene, since the traces of various polar compounds which are mainly the oxidation products of chloroorganic compounds, are adsorbed on the surface of the polar adsorbing materials; as a result, hexachlorobutadiene is finally purified.

The proposed method for purification of technical hexachlorobutadiene from chloroorganic admixures can be effected as follows.

Into an apparatus equipped with a reflux condenser, a stirrer and a thermometer, are charged technical hexachlorobutadiene and chlorosulfonic acid taken in the molar ratio of 1:1-4. The mixture is heated with stirring to a temperature from 100° to 150°C, preferably to 120°-140°C, and kept at this temperature for 15-120 minutes. The reaction mixture is then cooled to a temperature not above 80°C; as a result it separates into two layers, one of which contains the purified hexachlorobutadiene, whereas the other layer contains the spent chlorosulfonic acid and dissolved oxidation products of chloroorganic admixtures. The layer of purified hexachlorobutadiene is separated, neutralized with an alkali, for example with a 5-15 percent solution of sodium hydroxide or potassium hydroxide, and washed with water to neutral reaction. After washing, hexachlorobutadiene is allowed to settle for 2–5 minutes, and is then separated from water and dried by any of the known methods, for example over calcium chloride, zeolite, sodium sulfate, sodium hydroxide in the form of flakes, or any other suitable agent. The quantity of the drying agent should be 1-5 percent by weight with respect to the purified hexachlorobutadiene.

In order to intensify the process of oxidation of chloroorganic admixtures, technical hexachlorobutadiene should be purified in the presence of chlorine delivered into the reaction mixture. Chlorine is bubbled through the mixture in the ratio of 0.01 - 0.3 mole per mole of hexachlorobutadiene.

In order to improve the electrotechnical specifications of hexachlorobutadiene, it should be distilled after drying. The distillation can be carried out at atmospheric pressure. The first fraction, which is 10 percent of the initially charged material and contains insignificant quantities of admixtures, is returned for repeated neutralization, washing, drying and distillation, whereas the second fraction containing not less than 90 percent of the initially charged hexachlorobutadiene, is collected as the finished product. The vat residue does not exceed 0.5 percent of the initial charge.

Furthermore, in order to prepare hexachlorobutadiene of the required electrotechnical specifications, technical hexachlorobutadiene an be purified by the following method.

Technical hexachlorobutadiene is reacted with chlorosulfonic acid, the reaction mixture is cooled and the layer containing purified hexachlorobutadiene is separated in a way similar to that already described. The subsequent neutralization of hexachlorobutadiene with alkali is carried out at a temperature of 80°–100°C for 30–60 minutes. A 5-15 percent solution of sodium hydroxide or potassium hydroxide is used for the purpose. Next, hexachlorobutadiene is washed with chemically pure water and dried over any of the indicated drying agents, preferably over calcium chloride or zeolite. Thus dried hexachlorobutadiene is treated with a polar adsorbing agent (silica gel or alumina) taken in an amount not less than 3 percent by weight with respect to the purified hexachlorobutadiene.

The proposed invention ensures the preparation of pure hexachlorobutadiene having the following specifications:

| | |
|---|---|
| Assay, per cent by weight | 99.5 – 99.98 |
| Moisture, per cent by weight | not more than 0.002 |
| Acidity, in mg of KOH/g | not more than 0.01 |
| Mechanical admixtures | absent |

The proposed method for purification of hexachlorobutadiene is simple to carry out on an industrial scale, and can be easily run as either an intermittent or a continuous process. The product prepared by the proposed method can be used for the preparation of liquid insulating materials having low freezing points.

For a better understanding of the invention, the following examples of purification of technical hexachlorobutadiene from chloroorganic admixtures are given by way of illustration.

EXAMPLE 1

200 ml of technical hexachlorobutadiene having the following composition in percent by weight:

| | |
|---|---|
| hexachlorobutadiene | 95.45 |
| tetrachloroethylene | 0.30 |
| hexachloroethane | 0.63 |
| polychlorobutanes | 3.62 | were placed into a four-necked flask equipped with a reflux condenser. The mixture was heated with stirring to a temperature of 130°C, then 340 ml of technical chlorosulfonic acid having a specific gravity of $d_4^{20} = 1.752$ (the molar ratio of hexachlorobutadiene to the acid being 1:4) were added and the mixture was kept at this temperature for 1 hour. The reaction mixture was then cooled to 80°C, the layer containing the purified hexachlorobutadiene was separated from the layer containing spent chlorosulfonic acid and oxidized chloroorganic admixtures, neutralized with a 10 percent aqueous solution of sodium hydroxide to a slightly alkaline reaction and washed with water to neutral reaction. After drying over calcium chloride taken an amount of 1 percent by weight with respect to the purified hexachlorobutadiene, 186 ml of the product were obtained within 6 hours. The composition of the product in percent by weight was as follows:

| | |
|---|---|
| hexachlorobutadiene | 99.95 |
| perchloroethylene | 0.02 |
| hexachloroethane | 0.03 |

The purified product had the following specifications:
$d_4^{20} = 1.6807$; $n_D^{20} = 1.5557$; freezing point, -18.6°C. The yield of the purified hexachlorobutadiene was 97.3 percent of theory.

The spent chlorosulfonic acid was reused in the process several times, fresh portions being added.

EXAMPLE 2

200 ml of technical hexachlorobutadiene of the same composition as in Example 1, were placed into a four-necked flask equipped with a reflux condenser, a stirrer, a thermometer and a sparger for bubbling chlorine through the liquid. The mixture was heated to a temperature of 130°C, 170 ml of chlorosulfonic acid was added and chlorine was bubbled through at a rate of 0.1 g/min per kg of the reaction mixture, the molar ratio of hexachlorobutadiene to the acid and chlorine being 1:2:0.02. In 20 minutes the reaction mixture was cooled to a temperature of 40°C, the layer containing the purified hexachlorobutadiene was separated, neutralized with a 5 percent solution of sodium hydroxide and washed with water to neutral reaction. After drying over calcium chloride, taken in an amount of one percent by weight with respect to the purified hexachlorobutadiene, 181 ml of the product were obtained within 6 hours. The composition of the product was as follows (in percent by weight):

| | |
|---|---|
| hexachlorobutadiene | 99.95 |
| perchloroethylene | 0.04 |
| hexachloroethane | 0.01 |

The purified product had the following specifications:
$d_4^{20} = 1.6807$; $n_D^{20} = 1.5555$; freezing point, -18.6°C. The yield of the product was 94.8 percent of theory.

EXAMPLE 3

100 ml of technical hexachlorobutadiene having the following composition, in percent by weight:

| | |
|---|---|
| hexachlorobutadiene | 92.4 |
| perchloroethylene | 1.0 |
| hexachloroethane | 1.2 |
| polychlorobutanes | 5.4 | were charged into an apparatus equipped with a reflux condenser, a thermometer and a sparger. The product was heated to a temperature of 148°C, 170 ml of chlorosulfonic acid were added and chlorine was bubbled through at a rate of 0.08 g/min per kg of the reaction mixture, the molar ratio of hexachlorobutadiene to the acid and chlorine being 1:4:0.1. In two hours the reaction mixture was cooled to room temperature (20°-25°C), the layer of purified hexachlorobutadiene was separated and treated as described in Example 2.

The purified product, in the quantity of 83 ml had the following composition, in percent by weight:

| | |
|---|---|
| hexachlorobutadiene | 99.94 |
| perchloroethylene | 0.01 |
| hexachloroethane | 0.05 |

The specifications for the purified product were as follows: $d_4^{20} = 1.7810$; $n_D^{20} = 1.5559$; freezing point, −18.6°C. The yield of the purified hexachlorobutadiene was 90 percent of theory.

EXAMPLE 4

100 ml of technical hexachlorobutadiene having the following composition in percent by weight:

| | |
|---|---|
| hexachlorobutadiene | 97.91 |
| perchloroethylene | 0.34 |
| hexachloroethane | 0.02 |
| polychlorobutanes | 1.73 | were loaded into a four-necked flask equipped with a reflux condenser, a thermometer and a stirrer. The said technical product was reacted with 42 ml of chlorosulfonic acid (the molar ratio of hexachlorobutadiene to the acid being 1:1) at a temperature of 120°C for 15 minutes. The reaction mixture was then cooled to a temperature of 60°C, the layer containing the purified hexachlorobutadiene was separated, neutralized with a 10 percent solution of sodium hydroxide, washed with water and dried for 5 hours over zeolite in the sodium form taken in an amount of 5 percent by weight with respect to the purified hexachlorobutadiene.

Obtained were 96 ml (98 percent of theory) of pure hexachlorobutadiene having the following composition, in percent by weight:

| | |
|---|---|
| hexachlorobutadiene | 99.98 |
| perchloroethylene | 0.02 |

The purified hexachlorobutadiene had the following specifications: $d_4^{20} = 1.6808$; $n_D^{20} = 1.5556$; freezing point, -20°C; moisture, 0.005 percent by weight.

EXAMPLE 5

A layer of purified hexachlorobutadiene, obtained as described in Example 2, was neutralized with a 10 percent solution of sodium hydroxide at a temperature of 100°C for 30 minutes. Then it was washed with chemically pure water, dried for 3 hours over calcium chloride, taken in an amount of 3 percent by weight with respect to the purified hexachlorobutadiene, and treated for 3 hours with alumina taken in an amount of 10 percent by weight with respect to the processed hexachlorobutadiene.

Obtained were 176 ml (91.5 percent of theory) of purified product having the following composition in percent by weight:

| | |
|---|---|
| hexachlorobutadiene | 99.95 |
| perchloroethylene | 0.04 |
| hexachloroethane | 0.01 |

The purified hexachlorobutadiene was suitable for the manufacture of insulating fluids. The specifications of the product were as follows:

| | |
|---|---|
| moisture, in percent by weight | 0.002 |
| acidity, in mg of KOH/g | 0.0007 |
| dielectric loss tangent at 50 c/s and 70°C | 0.0020 |
| electric strength, kV-cm over | 180 |
| dielectric permeability | 2.5 |

$d_4^{20} = 1.6812$; $n_D^{20} = 1.5559$; freezing point, −20.6°C.

EXAMPLE 6

95 ml of chlorosulfonic acid ($d_4^{20} = 1.762$) and 200 ml of technical hexachlorobutadiene of the following composition, in percent by weight:

| | |
|---|---|
| hexachlorobutadiene | 96.10 |
| tetrachloroethylene | 0.21 |
| hexachloroethane | 0.58 |
| polychlorobutanes | 3.16 | were loaded into an apparatus equipped with a reflux condenser, a stirrer, and a thermometer.

The molar ratio of hexachlorobutadiene to the acid was 1:1. The mixture was heated to a temperature of 110°C and kept at this temperature for one hour. The reaction mixture was then cooled to a temperature of 60°C, the layer containing the thus purified hexachlorobutadiene was separated, neutralized with a 15 percent solution of sodium hydroxide at a temperature of 80°C, washed with chemically pure water, dried for 6 hours over calcium chloride taken in an amount of one percent by weight with respect to the purified hexachlorobutadiene and treated with silica gel for 12 hours. The quantity of silica gel was 5 percent by weight with respect to the purified hexachlorobutadiene.

Obtained were 180 ml (94 percent of theory) of purified product having the following composition, in percent by weight:

| | |
|---|---|
| hexachlorobutadiene | 99.78 |
| perchloroethylene | 0.12 |
| hexachloroethane | 0.1 |

The purified hexachlorobutadiene was suitable for the manufacture of liquid insulation. Its specifications were as follows:

| | |
|---|---|
| moisture, in percent by weight | 0.002 |

| | |
|---|---|
| acidity, in mg of KOH/g | 0.0012 |
| dielectric loss tangent at 50 c/s and 70°C | 0.004 |
| electric strength, kV/cm over | 180 |
| dielectric permeability | 2.51 |

$d_4^{20} = 1.680$; $n_D^{20} = 1.5552$; freezing point, $-21°C$.

EXAMPLE 7

A layer of purified hexachlorobutadiene obtained as described in Example 6, was neutralized with a 5 percent solution of sodium hydroxide, washed with water and dried for 12 hours over calcium chloride, taken in amount of 1 percent by weight with respect to the purified hexachlorobutadiene. The dried hexachlorobutadiene (186 ml) was fractionated. The first fraction in an amount of 18 ml (9.7 percent of the initially loaded hexachlorobutadiene) was returned for repeated neutralization, washing with water, drying and distillation. The second fraction in an amount of 167 ml (89.6 percent of the initial load) was collected as the finished product. The vat residue was 1 ml, which is about 0.6 percent of the initial load.

The total yield of hexachlorobutadiene, taking into account the return of the first fraction, was 90–93 percent of theory. The obtained product had the following composition, in percent by weight:

| | |
|---|---|
| hexachlorobutadiene | 99.8 |
| perchloroethylene | 0.1 |
| hexachloroethane | 0.1 |

The purified hexachlorobutadiene was suitable for the preparation of insulating liquid. The specifications of the product were as follows:

| | |
|---|---|
| moisture, in percent by weight | 0.001 |
| acidity, in mg of KOH/mg | 0.0013 |
| dielectric loss tangent at 50 c/s and 70°C | 0.0021 |
| electric strength, kV/cm over | 180 |
| dielectric permeability | 2.5 |

$d_4^{20} = 1.6810$; $d_D^{20} = 1.5558$; freezing point, $-20.6°C$.

EXAMPLE 8

Technical hexachlorobutadiene was purified in a continuous process.

Technical hexachlorobutadiene preheated to a temperature of 130°C, containing 94.62 percent by weight of the basic substance, 0.63 percent by weight of perchloroethylene, 0.85 percent of hexachloroethane and 3.9 percent by weight of polychlorobutanes and chlorsulfonic acid ($d_4^{20} = 1.755$) were pumped at a rate of 50 kg/hour and 67.2 kg/hour respectively onto a porous partition in the lower part of the sectioned column. Chlorine was also delivered onto the same partition at a rate of 4 kg/hr. The molar ratio of hexachlorobutadiene to the acid and chlorine was 1:3:0.3. The process temperature was 130°C; the time during which the reaction mixture was present in the apparatus was 15 minutes. On emerging from the column, the reaction mixture was cooled to a temperature of 70°C, the layer of purified hexachlorobutadiene was separated in a Florence flask, neutralized with a heated to 80°–90°C solution of sodium hydroxide, washed with chemically pure water to neutral reaction, dried over calcium chloride and treated with alumina in a column. The time during which hexachlorobutadiene was present in the said apparatus was about one hour, the consumption of calcium chloride and alumina was about 5 to 7 percent by weight with respect to the purified hexachlorobutadiene. In order to separate hexachlorobutadiene from alumina particles entrapped in the flow, it was passed through cermet filters. The yield of the purified product was 90 percent of theory. The product had the following composition, in percent by weight:

| | |
|---|---|
| hexachlorobutadiene | 99.8 |
| perchloroethylene | 0.13 |
| hexachloroethane | 0.07 |

The purified hexachlorobutadiene had the following specifications:

| | |
|---|---|
| moisture, in percent by weight | 0.002 |
| acidity, in mg of KOH/g | 0.001 |
| dielectric loss tangent at 50 c/s and 70°C | 0.004 |
| electric strength, kV/cm over | 180 |
| dielectric permeability | 2.5 |

$d_4^{20} = 1.681$; $n_D^{20} = 1.5560$; freezing point, $-20.0°C$.

We claim:

1. A method for purification of technical hexachlorobutadiene containing chloroorganic admixtures including perchloroethylene, hexachloroethane, hexachloracyclopentadiene and polychlorobutanes comprising reacting said technical hexachlorobuadiene with chlorosulfonic acid at a molar ratio of 1:1–4 and at a temperature of 100°–150°C; cooling the reaction mixture to a temperature not above 80°C with formation of a layer of purified hexachlorobutadiene and a layer containing chlorosulfonic acid and oxidized chloroorganic admixtures; separating the layer of purified hexachlorobutadiene and neutralizing, washing with water and drying the separated layer of purified hexachlorobutadiene.

2. A method according to claim 1, wherein the dried separated layer of hexachlorobutadiene is distilled.

3. A method according to claim 1, wherein the separated, purified hexachlorobutadiene layer is neutralized at a temperature of 80°–100°C, washed with chemically pure water, and dried, followed by treating the dried hexachlorobutadiene with a polar adsorbing material, selected from the group consisting of silica gel and alumina, taken in an amount not less than three percent by weight with respect to the purified hexachlorobutadiene.

4. A method according to claim 1, wherein the technical hexachlorobutadiene is reacted with chlorosulfonic acid in a current of chlorine, the molar ratio of hexachlorobutadiene to chlorine being 1:0.01–0.3.

5. A method according to claim 4, wherein the dried separated layer of hexachlorobutadiene is distilled.

6. A method according to claim 4, wherein the separated, purified hexachlorobutadiene layer is neutralized at a temperature of 80°–100°C, washed with chemically pure water and dried, followed by treating the dried hexachlorobutadiene with a polar adsorbent selected from the group consisting of silica gel and alumina taken in an amount of not less than 3 percent by weight with respect to the purified hexachlorobutadiene.

* * * * *